United States Patent
Chen et al.

(10) Patent No.: US 10,769,002 B2
(45) Date of Patent: *Sep. 8, 2020

(54) MANAGING A VIRTUAL OBJECT

(71) Applicant: International Business Machines Corporation, Armonk, NY (US)

(72) Inventors: Pamela Chen, Taipei (TW); Rebecca L J Chen, Taipei (TW); Jacqueline Yen, Taipei (TW); Cecelia Y C Yu, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/110,414

(22) Filed: Aug. 23, 2018

(65) Prior Publication Data

US 2018/0365084 A1    Dec. 20, 2018

Related U.S. Application Data

(63) Continuation of application No. 13/418,163, filed on Mar. 12, 2012, now Pat. No. 10,114,683, which is a (Continued)

(30) Foreign Application Priority Data

Mar. 31, 2009 (TW) .................................. 98110594

(51) Int. Cl.
*G06F 9/54* (2006.01)
*G06F 3/00* (2006.01)
(Continued)

(52) U.S. Cl.
CPC ................ *G06F 9/542* (2013.01); *G06F 3/00* (2013.01); *G06F 3/033* (2013.01); *G06F 9/54* (2013.01); *G06F 15/16* (2013.01)

(58) Field of Classification Search
None
See application file for complete search history.

(56) References Cited

U.S. PATENT DOCUMENTS

| 5,590,326 A | 12/1996 | Manabe |
| 5,917,495 A | 6/1999 | Doi et al. |

(Continued)

FOREIGN PATENT DOCUMENTS

| TW | 200901020 A | 1/2009 |
| WO | 2002075530 | 9/2002 |
| WO | 2007093812 A1 | 8/2007 |

OTHER PUBLICATIONS

Hill, Will et al., "Recommending and Evaluating Choices in a Virtual Community of Use", http://www.sigchi.org/chi95/proceedings/papers/wch_bdy.htm.

(Continued)

*Primary Examiner* — James A Edwards
(74) *Attorney, Agent, or Firm* — Fabian VanCott; Steven L. Nichols

(57) ABSTRACT

Managing a virtual object in a server device includes storing the virtual object in a database accessible to the server device and, in response to a non-subscriber user performing a first action on the virtual object, sending a message from the server device to at least one user that subscribes to the virtual object.

20 Claims, 5 Drawing Sheets

Related U.S. Application Data continuation of application No. 12/731,340, filed on Mar. 25, 2010, now Pat. No. 9,384,067.

(51) Int. Cl.
*G06F 3/033* (2013.01)
*G06F 15/16* (2006.01)

(56) References Cited

U.S. PATENT DOCUMENTS

| | | | |
|---|---|---|---|
| 6,049,805 A | 4/2000 | Drucker et al. | |
| 6,476,830 B1 * | 11/2002 | Farmer | G06N 3/006 705/27.1 |
| 8,739,037 B1 | 5/2014 | Hoffman | |
| 2002/0087704 A1 | 7/2002 | Chesnais | |
| 2002/0113809 A1 * | 8/2002 | Akazawa | G06F 3/04815 715/706 |
| 2004/0051745 A1 | 3/2004 | Gargi | |
| 2004/0267694 A1 | 12/2004 | Sakai | |
| 2005/0138430 A1 | 6/2005 | Landsman | |
| 2006/0293103 A1 | 12/2006 | Mendelsohn | |
| 2008/0147659 A1 | 6/2008 | Chen et al. | |
| 2008/0157969 A1 | 7/2008 | Beringer | |
| 2008/0220876 A1 | 9/2008 | Mehta | |
| 2008/0221998 A1 | 9/2008 | Mendelsohn et al. | |
| 2008/0313105 A1 | 12/2008 | Mattern | |
| 2009/0063283 A1 | 3/2009 | Kusumoto et al. | |
| 2009/0141023 A1 | 6/2009 | Shuster | |
| 2009/0201299 A1 | 8/2009 | Bhogal | |
| 2009/0222744 A1 | 9/2009 | Renner | |
| 2010/0125800 A1 | 5/2010 | Jana | |
| 2010/0146085 A1 | 6/2010 | Van Wie | |
| 2010/0162149 A1 | 6/2010 | Sheleheda | |
| 2010/0162404 A1 | 6/2010 | Dawson et al. | |
| 2010/0257464 A1 | 10/2010 | Renner | |
| 2011/0316852 A1 | 12/2011 | Shuster | |
| 2012/0029987 A1 | 2/2012 | Kusumoto | |
| 2014/0007009 A1 | 1/2014 | Kulusky, Jr. et al. | |

OTHER PUBLICATIONS

Bryl, Volha et al., "ToothAgent: A MultiAgent System for Virtual Communities Support", http://www.dit.unitn.it/~bryl/bryl-giorgini-fante-06-AOIS.pdf.

A. B. Roach, Session Initiation Protocol (SIP)—Specific Event Notification (http://www.ietf.org/rfc/rfc3265.txt), Jun. 2002.

A. Niemi, ED.; Session Initiation Protocol (SIP) Extension for Event State Publication (http://www.ietf.org/rfc/rfc3903.txt); Oct. 2004.

* cited by examiner

MANAGING A VIRTUAL OBJECT

CROSS-REFERENCE TO RELATED APPLICATIONS

The present application is a continuation of and claimed priority under 35 U.S.C. § 120 to U.S. application Ser. No. 13/418,163, filed Mar. 12, 2012, entitled "MANAGING A VIRTUAL OBJECT," which is a continuation of U.S. application Ser. No. 12/731,340, filed Mar. 25, 2010, entitled "MANAGING A VIRTUAL OBJECT," each of which is incorporated herein by reference in their entirety. In turn, U.S. application Ser. No. 12/731,340 claims priority under 35 U.S.C. § 119(a) from Taiwanese Patent Application Serial No. 98110594, filed on Mar. 31, 2009.

BACKGROUND

Aspects of the present invention relate to an information service incorporating virtual objects, and more particularly to the interactions users and virtual objects in the information service.

The Internet enables a variety of information services, by which a user can use his computer or other electronic devices to interact with other remote users. Such well-known information services include online transaction platforms, online social networking platforms, and online gaming platform Another popular type of information service available through the Internet is that of a "virtual world" which provides transactions, social networking, and gaming together. In this type of service, a user can select an "avatar" and can change the appearance or even the gender of the avatar at any time. Using the avatar as his or her proxy, the user can travel around the virtual world, chat with other users/avatars, or join a community to participate in activities in the virtual world.

Through the avatar, a user also can interact with virtual objects implemented in the virtual world. For example, an avatar can buy or sell a virtual object or even try on a virtual item of clothing. By performing actions on a virtual object, one or more computers implementing the "virtual world" may alter selected characteristics associated with that virtual object based on a programmed functions associated with the virtual object, and render the virtual object in the "virtual world" according to its altered state. For example, if a first user "sells" a virtual object to a second user, ownership data associated with the virtual object may be altered to transfer ownership from the first user to the second user.

BRIEF SUMMARY

A method of managing a virtual object in a server device includes: storing the virtual object in a database accessible to the server device; and in response to a non-subscriber user performing a first action on the virtual object, sending a message from the server device to at least one user that subscribes to the virtual object.

A method of managing a virtual object includes: rendering the virtual object in a virtual environment implemented by at least one server device, the virtual environment being accessible to multiple users of the virtual environment; maintaining in the at least one server device a database of users that subscribe to the virtual object; and in response to a non-subscriber user performing a first action on the virtual object in the virtual environment, sending a message from the at least one server device to at least one of the users that subscribe to the virtual object.

A server device includes a processor; and a memory communicatively coupled to the processor; the memory having executable code that causes the processor, upon execution of the executable code, to: maintain a database that includes a virtual object; maintain a database of users that subscribe to the virtual object; and in response to receiving a request from a non-subscriber user to perform a first action on the virtual object, send a message to at least one of the users that subscribe to the virtual object.

A computer program product for managing a virtual object includes a computer readable storage medium having computer readable program code embodied therewith. The computer readable program code includes computer readable program code configured to store the virtual object in a database and computer readable program code configured to, in response to a non-subscriber user performing a first action on the virtual object, send a message to at least one user that subscribes to the virtual object.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
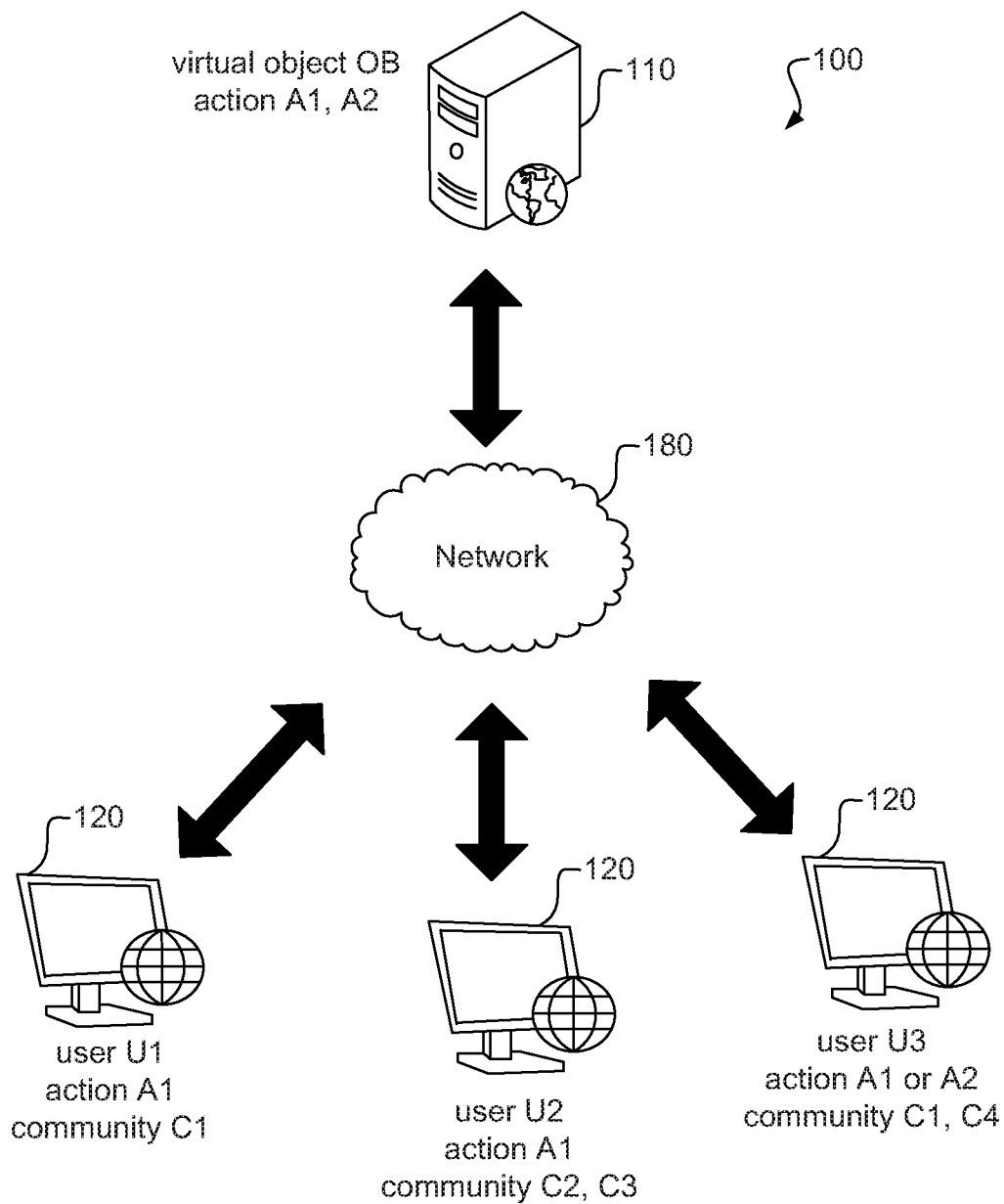
FIG. 1 is a diagram of an illustrative information service system according to one exemplary embodiment of the principles described herein.

As will be appreciated by one skilled in the art, aspects of the present invention may be embodied as an apparatus, a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification and in the appended claims, the term "virtual object" refers to a computer-implemented representation of a physical object.

As used in the present specification and in the appended claims, the term "perform an action," when used with reference to a virtual object, refers to performing a function on the virtual object that is recognized and implemented by the computer system implementing the virtual object.

FIG. 1 is an exemplary diagram of information service system 100 according to an embodiment of the present invention. The system 100 includes one or more servers 110 and one or more client devices 120, such as desktop, laptop, mobile device, etc. A server 110 is communicated with a client device via the network 180. The network 180 can be any type of network such as the Internet, a local area network (LAN), a wide area network (WAN), a virtual private network (VPN), etc. In any event, communication between the server 110 and the client device 120 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In addition, it should be understood, however, that although not shown, other hardware and software components (e.g., additional computer systems, routers, firewalls, etc.) could be included in the network 180.

The information service provided by the system 100 could be an online transaction platform, an online social networking platform, an online gaming platform, or the combinations thereof. In an embodiment, the information service provided by the system 100 is similar to a "virtual world" environment provided by Second Life® of Linden Lab, which is characterized by incorporating "virtual objects."

In this embodiment, the virtual object is created by computer code programming, and exists only in term of the computer processes used to run the information service. The virtual object could be shown to the user in text or in graphic at a client device 120, and the user can execute particular actions with respect to the virtual object. For example, through his avatar, the user can "use," "fetch," "put," "receive," or "give" a virtual object.

When a virtual object is created, a number of actions associated with the virtual object will be predetermined. For example, a virtual "dress" could be "tried on," "sold" and "bought." But the actions associated with the virtual object can be added, deleted, or changed later.

Sometimes a virtual object can correspond to an object in the real world. Therefore a transaction of a virtual object can represent a transaction of an object in the real world. But a virtual object can also have nothing to do with anything in the real world. The virtual object described in the specification may be of the type implemented in Second Life® of Linden Lab, including, but not limited to, virtual buildings, virtual scenes, virtual vehicles, virtual furniture, virtual machines, virtual clothes, etc. Note that the information service provider could also create the virtual object.

In certain embodiments, a user of the information service can use an avatar to participate in the information service. Typically an avatar can be shown in graphic or in text on the user interface of the client device 120, and the user can control the avatar through use of a data input device (e.g., keyboard or mouse), to interact with (e.g., chat with) other users or to process (e.g., fetch) the virtual object. Note that in the present invention, a user is also able to interact with other users or virtual objects without using the avatar.

Figure 2:
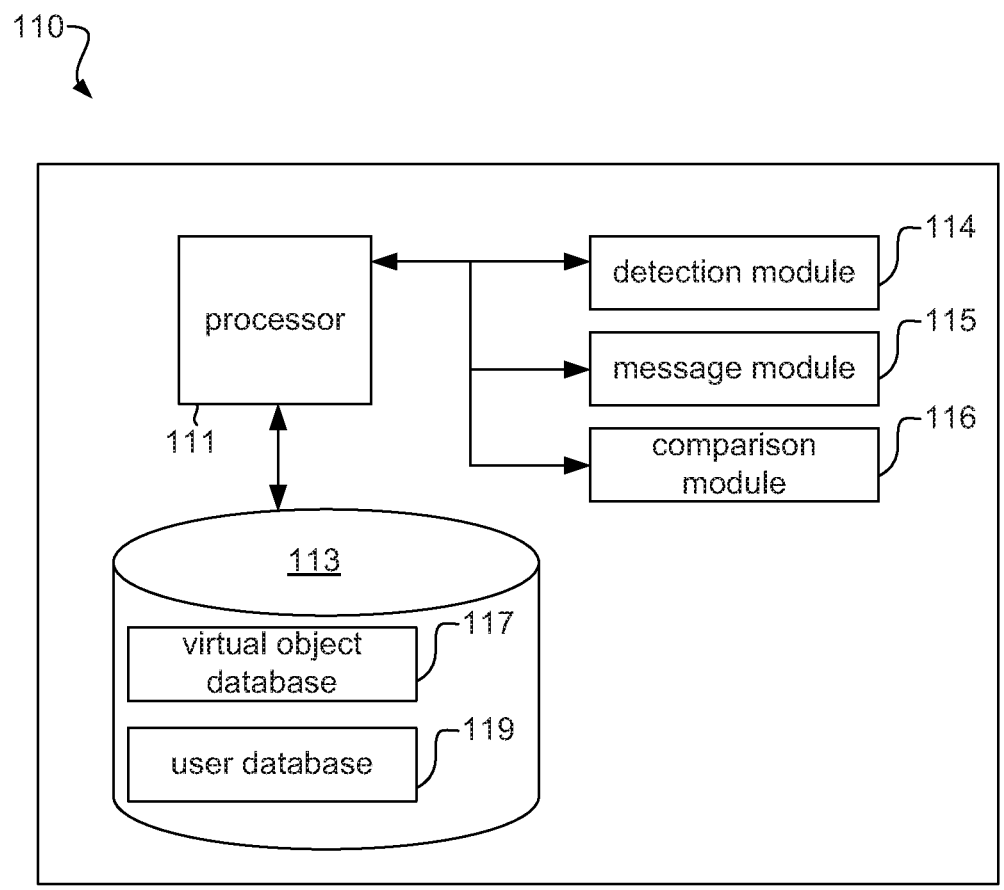
FIG. 2 is a block diagram of an illustrative server according to one exemplary embodiment of the principles described herein.

As shown in FIG. 2, the server 110 has a processor 111 and a storage device 113. In addition, the server 110 can have buses, I/O interface, input or output devices (such as keyboard and display), memories, caches, a communication system, and server software, all of which are not shown in the drawings. The processor could be a processor for the general information service server, such as Xeon® of Intel Corporation, and Athlon® or Opteron® of Advanced Micro Devices. ("Xeon" is a registered trademark of Intel Corporation in the United States, other countries, or both. "Athlon" and "Opteron" are registered trademarks of Advanced Micro Devices, Inc. in the United States, other countries, or both.) Note that the server 110 may have more than one processor. The storage device 113 can have one or more storage devices such as a hard disk drive or an optical disk drive. In other embodiments, the storage device 113 can have data spread in such as a LAN, a WAN or a SAN. The processor 111 executes an application program to provide a detection module 114, a message module 115, and a comparison module 116. Meanwhile, the processor 111 can execute the application program to access or read/write the virtual object database 117 and the user database 119 maintained in the storage device 113.

The virtual object database 117 records the virtual objects in the information services and the actions executable to the virtual objects. In addition, the virtual object database 117 sets a user as a subscriber when he executes an action to a virtual object. The user database 119 keeps profiles of users, and a profile may record the communities that the user has joins, the activities that user has attended, or any other logs generated by the user when using in the information service, or any personal information that the user agrees to disclose.

Figure 3:
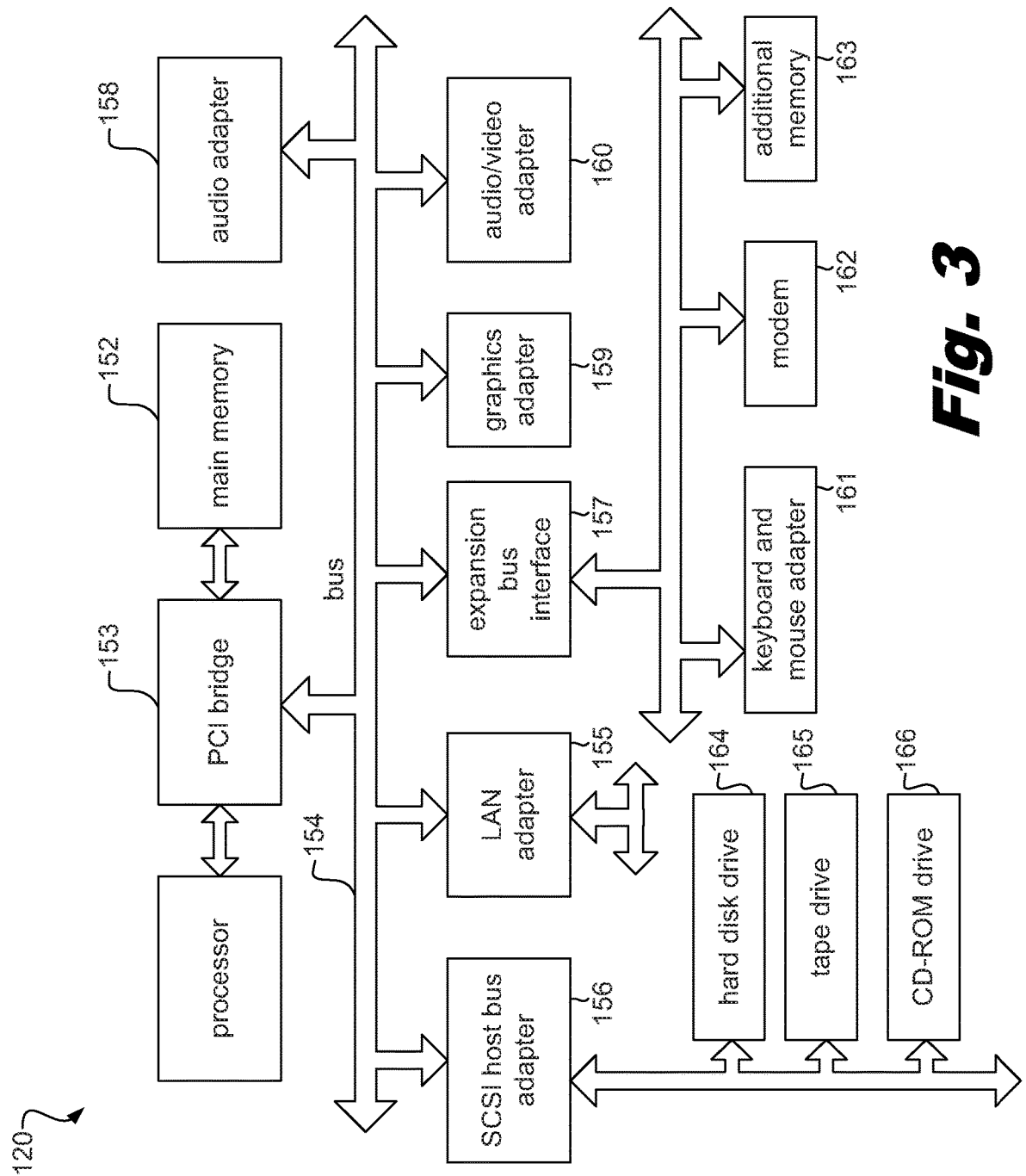
FIG. 3 is a block diagram of an illustrative client device according to one exemplary embodiment of the principles described herein.

FIG. 3 is an exemplary block diagram of a client device 120 according to one embodiment of the present invention. The client device 120 employs a peripheral component interconnect (PCI) local bus architecture. Although the depicted example employs a PCI bus, other bus architectures such as Accelerated Graphics Port (AGP) and Industry Standard Architecture (ISA) may be used. Processor 151 (e.g., a CPU of Intel) and main memory 152 are connected to PCI local bus 154 through PCI bridge 153. PCI bridge 153 also may include an integrated memory controller and cache memory for processor 151.

In the depicted example, local area network (LAN) adapter 155, small computer system interface (SCSI) host bust adapter 156, and expansion bus interface 157 are connected to PCI local bus 154 by direct component connection. In contrast, audio adapter 158, graphics adapter 159, and audio/video adapter 160 are connected to PCI local bus 154 by add-in boards inserted into expansion slots. Expansion bus interface 157 provides a connection for a keyboard and mouse adapter 161, modem 162, and additional memory 163. SCSI host bus adapter 156 provides a connection for hard disk drive 164, tape drive 165, and CD-ROM drive 166. Typical PCI local bus 154 implementations will support three or four PCI expansion slots or add-in connectors.

An operating system runs on the processor 151 and is used to coordinate and provide control of various components within the client device 110. The operating system may be a commercially available operating system such as Windows XP® of Microsoft Corporation. ("Windows XP" is a registered trademark of Microsoft Corporation in the United States, other countries, or both.) Instructions for the operating system, and applications or programs are located on storage devices, such as the hard disk drive 154, and may be loaded into the main memory 152 for execution by the processor 151.

Figure 4:
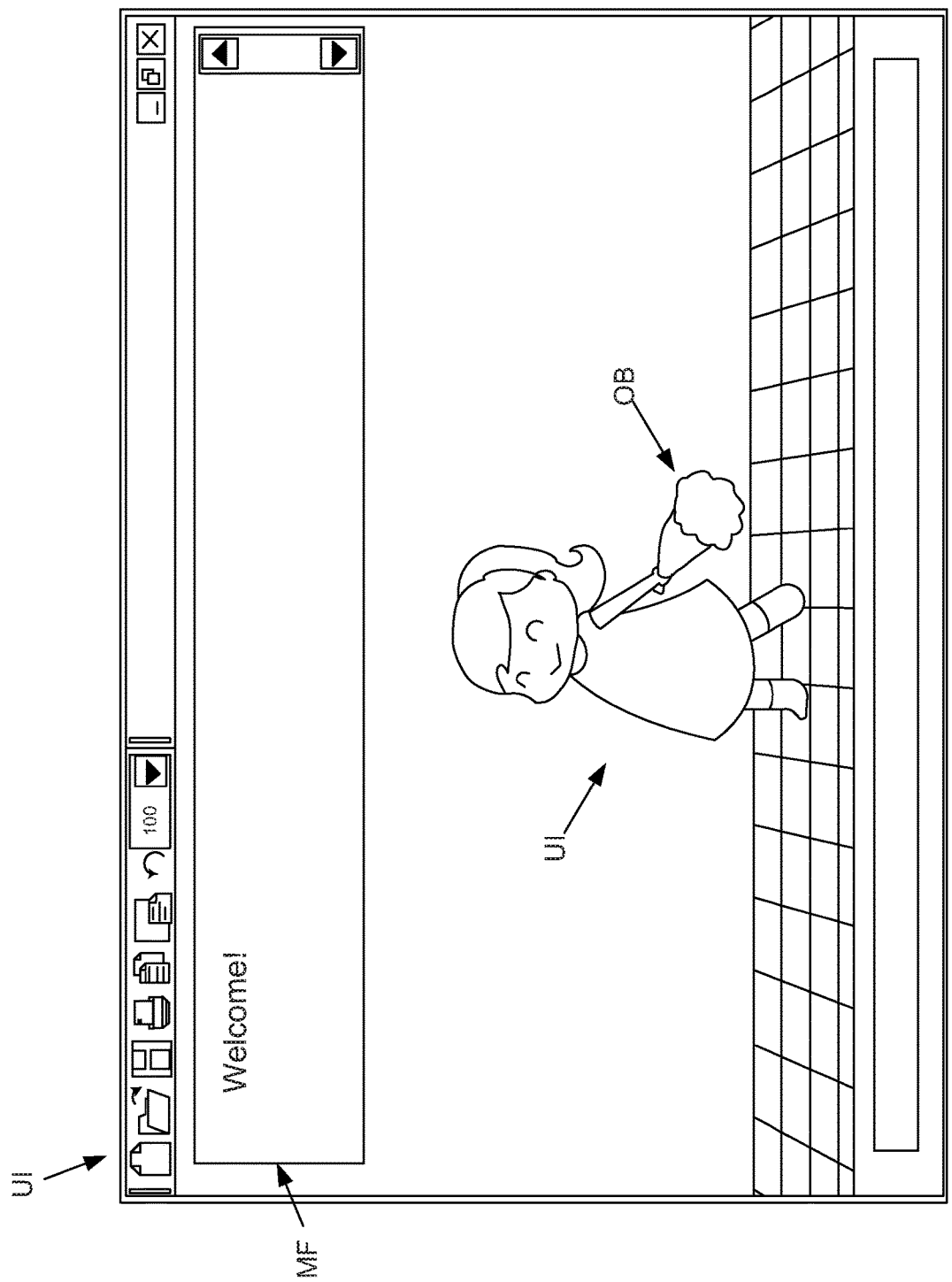
FIG. 4 is a diagram of an illustrative user interface at an illustrative client device according to one exemplary embodiment of the principles described herein.

Processor 151 also executes a client process to communicate with server 110, to allow the user logon to server 110 to use the information service 100. In addition, as shown in FIG. 4, the client process can provide a user interface UI to show a virtual object OB (a flower) and an avatar AV (a little girl). The user can use the keyboard or mouse of the client device 120 to control the virtual object OB and the avatar AV. The user interface UI has a message field to show the message sent from server 110. In some embodiments, the user can even use the interface UI to create a virtual object.

Figure 5:
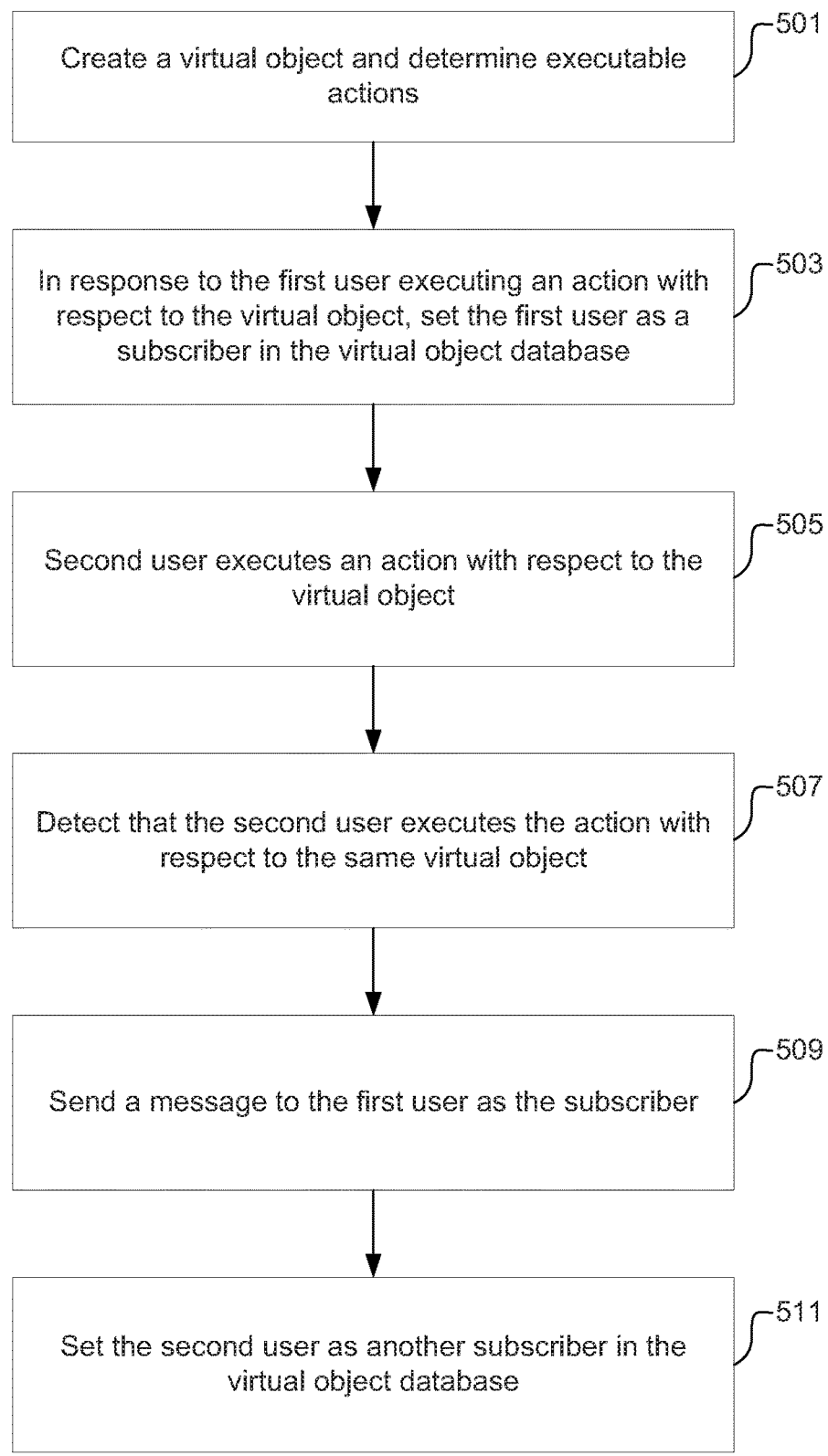
FIG. 5 is a flowchart diagram of an illustrative method according to one exemplary embodiment of the principles described herein.

In the following the embodiment shown in FIG. 1 is further explained with the flowchart in FIG. 5. In step 501, the user U1 uses a client device 120 to logon to the server 110 and then uses the tools provided by the information service to create a virtual object OB (such as a flower) and determine the appearance of virtual object OB (e.g., a red flower) and actions A1 and A2 executable to the virtual object OB (e.g., "fetch," "give," "wave," "throw," "buy," etc.) In other embodiments, the virtual object OB and the executable actions could be created and determined by the information service provider.

In step 503, the user U1 executes an action A1 with respect to the virtual object OB, and the virtual object database 117 will accordingly record the virtual object OB and the action A1, and further set the user U1, who executes the action A1 to the virtual object OB, as a subscriber. Note that user A1 could be set as a subscriber corresponding to the virtual object OB (say, an OB subscriber) or as a subscriber corresponding to the action A1 of the virtual object OB (say, an A1 subscriber).

In step 505, another user U2 uses his client device 120 to logon to the server 110 and executes the action A1 to the virtual object OB.

In step 507, the detection module 114 detects that the user U2 executes the action A1 to the same virtual object OB as the user U1 did. For example, the detection module 114 can query user log files to determine if the user U2 has executed any action to the virtual object OB and what actions he has executed. In step 509, in response to the detection of detection module 114, the message module 115 sends a message to the user U1, who has become a subscriber of the message in step 503.

Then in step 511, the virtual object database 117 also set the user U2 as another subscriber. In other words, both users U1 and U2 are subscribers now. In an embodiment, users U1 and U2 are set as OB subscribers, but in another embodiment, the user U1 is an OB subscriber and the user U2 is an A1 subscriber. More details will be provided later.

Moreover, in steps 503 and 509, the subscribers set by the virtual object database 117 receive messages from the message module 115. This part could be implemented in the server 110 using Session Initiation Protocol (SIP).

Then similar to step 505, another user U3 can use his client device 120 to logon the server 110 and executes an action A2 to the virtual object OB. Similar to step 507, detection module 114 detects that the user U3 executes the action A2 to the same virtual object OB as user U1 did with the action A1. In this embodiment, although users U1 and U3 execute different actions to the same virtual object OB, the detection module 114 still inform the message module 115 to send a predetermined message to the client device 120 of the user U1 as an OB subscriber. But in another embodiment, because users U2 and U3 executes different actions A1 and A2 to the virtual object OB, the message module 115 will not send a message to the client device 120 of the user U2, who is set as an A1 subscriber.

Accordingly, if the user U3 executes the action A1 to the virtual object OB, the message module 115 will send a message to the client device 120 of the user U1, who is an OB subscriber, and also the message module 115 will send a message to the client device 120 of the user U2, who is an A1 subscriber. In the subsequent step 511, the user U3 could be set as both an OB subscriber and an A1 subscriber at the same time.

Generally, a message from the message module 115 can include any kinds of content. In an embodiment, the message module 115 uses the message to reports to the user U1 the event that user U2 or U3 execute actions to the virtual object OB, and the message will be shown in the message field MF of user interface of the client device 120. In another embodiment, the message from the message module 115 can contain user profiles that stored in the user database 119. More details will be discussed later.

In an embodiment, a user can join a number of communities, and users in a community will receive notices or information associated with that community. For example, user profiles that stored in the user database 119 can record the communities that a user joins. In addition to the communities that a user joins, the user profiles can record the "virtual property" that the user owns or the characteristic of the avatar that the user chooses. A user can use the user interface UI (shown in FIG. 4) to edit or revise his user profile. In the following the present invention will be further explained with the community mention above.

In this example, the user database 119 records that user U1 joins the community C1, the user U2 joins the communities C2 and C3, and the user U3 joins the communities C1 and C4. When users U1-U3 join these communities, they can decide whether to disclose the communities they join. If not, certain communities they join will not be reported by the message module 115 to other users. In addition, the user database 119 may only provide some but not all (for example, only two) communities that a user joins most recently for the message module 115 to send messages to subscribers.

If the user U1 has been set as an OB subscriber, then when the detection module 114 detects that user U2 executes an action A1 to the virtual object OB, the message module 115 will send a message to the user U1 to report the names or other information of the communities C2 and C3 that the user U2 has joined. In another embodiment, the message module 115 reports only one of the communities C2 and C3 to the user U1. For example, the message module 115 can query a community database (not shown) and determines the community C2 has more members or a longer history, so it only recommends the community C2 to the user U1.

If the user U2 has been set as an A1 subscriber, then when the detection module 114 detects that user U3 executes the action A1 to the virtual object OB, the message module 115 will send a message to the user U2 to report the names or other information of the communities C1 and C4 that the user U3 has joined.

Meanwhile the user U1 has been set as an OB subscriber, so when the detection module 114 detects that user U3 executes an action to the virtual object OB, the message module 115 will send a message to the user U1 to report the names or other information of the communities C1 and C4 that the user U3 has joined. In another embodiment, the comparison module 116 will compare the profiles of users U1 and U3, e.g., to compare the community C1 that the user U1 joined with the communities C1 and C4 that the user U3 joined. After the comparison, the comparison module 116 will inform the message module 115 to only report to the user U1 the community C4 that the user U1 has not joined. In other words, if the communities that the user U1 and the user U3 have joined are the same, for example, if the user U1 and the user U3 both only join the community C1, the message module 115 will not report to the user U1 that the user U3 also joins the same community C1.

Moreover, when the user U1 or U2 receives the message reporting the new community (e.g., the community C4) from the message module 115, the user U1 or U2 can use the user interface UI as shown in FIG. 4 to decide whether he also like to join the community C4. For example, the interface UI may provide a selection menu (not shown) for the new communities to the user. If the user U1 or U2 decides to join the community C4, the user database 119 will update or revise the profile of the user U or U2, to record that the user U1 or U2 joins the community C4. In another embodiment, the server 110 may automatically enroll the user U1 or U2 to the community C4 and update the user database 119 accordingly.

Preferably, the detection module 114, the message module 115, and the comparison module 116 are implemented on the server 110, using the SUBSCRIBE, NOTIFY, and PUBLISH processes described in the SIP protocol. More details could be referred to A. B. Roach, *Session Initiation Protocol (SIP)-Specific Event Notification* (http://www.ietf.org/rfc/rfc3265.txt) and A. Niemi, Ed, *Session Initiation Protocol (SIP) Extension for Event State Publication* (http://www.i-etf.org/crf/rf3903.txt). Particularly, in an embodiment, the users U1-U3 are not made aware of these processes, so nothing will bother them when they enjoy the information service.

The arrangement mentioned above provides long-term user interactions in the present invention. When a "subsequent" user (e.g., the users U2 or U3) executes an action to the virtual object OB, the community that the subsequent user joins will be reported to a "prior" user (say, the user U1) who has executed an action to the virtual object OB before. In other words, the user who is the first one to execute an action to the virtual object OB will receive the community information of all subsequent users. Also as long as the virtual object OB still exists and whenever a new subsequent user executes an action to it, all prior users will receive the community information of the new subsequent user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A server device, comprising:
    a processor; and
    a memory communicatively coupled to said processor; said memory comprising executable code that causes said processor, upon execution of said executable code, to:
    store a virtual object in a database accessible to the server device, said database comprising a number of avatars and a number of virtual objects distinct from said avatars; and
    in response to a non-subscriber user performing, with one of said avatars, a first action on said virtual object, send a message from said server device to at least one user that subscribes to said virtual object;
    wherein said at least one user that subscribes to said virtual object comprises at least one user subscribing to said virtual object that is not a member of a community to which said non-subscriber user belongs.

2. The server device of claim 1, wherein said non-subscribing user and said at least one user that subscribes to said virtual object are each associated with at least one client computing device communicatively coupled to said server device.

3. The server device of claim 1, further comprising executable code for making said non-subscriber user a subscriber to said virtual object with said server device.

4. The server device of claim 1, wherein said at least one user that subscribes to said virtual object comprises any user subscribing to said virtual object that has performed an action on said virtual object that is the same as said first action performed by said non-subscriber user on said virtual object.

5. The sever device of claim 1, wherein said at least one user that subscribes to said virtual object comprises all users subscribing to said virtual object.

6. The server device of claim 1, further comprising a database of users managed by said server device.

7. The server device of claim 6, further comprising executable code for updating a profile associated with said at least one user that subscribes to said virtual object in response to said non-subscriber user taking said first action on said virtual object.

8. The server device of claim 6, further comprising executable code for creating a profile for said non-subscriber user in said user database and sending said profile for said non-subscriber user to said at least one user that subscribes to said virtual object in response to said non-subscriber user taking said first action on said virtual object.

9. A method of managing a virtual object, the method comprising, with a programmed server:
    maintaining a database comprising a number of avatars and a virtual object distinct from said avatars;
    maintaining a database of users that subscribe to said virtual object; and
    in response to receiving a request from a non-subscriber user to perform a first action on said virtual object, sending a message to at least one of said users that subscribe to said virtual object;
    wherein said at least one of said users that subscribe to said virtual object comprises any user subscribing to said virtual object that has performed an action on said virtual object that is the same as said first action performed by said non-subscriber user on said virtual object.

10. The method of claim 9, further comprising, with an interface to a network such that said server is communicatively coupled to a plurality of client computing devices through said network; associating each of said users that subscribe to said virtual object and said non-subscriber user with at least one of said client computing devices.

11. The method of claim 9, further comprising, in response to a subscription action, changing said non-subscriber user to a subscriber to said virtual object.

12. The method of claim 9, wherein said at least one of said users that subscribe to said virtual object comprises all users subscribing to said virtual object.

13. The method of claim 9, wherein said at least one of said users that subscribe to said virtual object comprises at least one user subscribing to said virtual object that is not a member of a community to which said non-subscriber user belongs.

14. The method of claim 9, further comprising implementing a virtual environment and rendering said virtual object in said virtual environment such that said virtual object is accessible to said users that subscribe to said virtual object and said non-subscriber user through said virtual environment.

15. A server device, comprising:
a processor; and
a memory communicatively coupled to said processor; said memory comprising executable code that causes said processor, upon execution of said executable code, to:
render a virtual object in a virtual environment implemented by at least one server device, said virtual environment including both a number of avatars and a number of virtual objects distinct from said avatars, said rendered virtual object being one of the virtual objects distinct from said avatars and being accessible to a plurality of users of said virtual environment;
maintain in said at least one server device a database of users, from among said plurality of users, that subscribe to said virtual object so as to distinguish between users that subscribe to said virtual object and users that have not subscribed to said virtual object; and
in response to a non-subscriber user that has not subscribed to said virtual object directly performing a first action on said virtual object in said virtual environment, send a message from said at least one server device to at least one of said users that subscribe to said virtual object.

16. The server device of claim 15, wherein said at least one user that subscribes to said virtual object comprises at least one user subscribing to said virtual object that is not a member of a community to which said non-subscriber user belongs.

17. The server device of claim 15, wherein each of said users interacts with said virtual environment through a computer-implemented avatar.

18. The server device of claim 17, wherein said non-subscriber user performs said first action on said virtual object by instructing said avatar associated with said non-subscriber user to perform an action on said virtual object in said virtual environment.

19. The server device of claim 15, further comprising executable code for making said non-subscriber user into a subscriber user by adding said non-subscriber user with said server device to said database of said users that subscribe to said virtual object.

20. The server device of claim 15, further comprising executable code for creating a profile for said non-subscriber user in said user database and sending said profile for said non-subscriber user to said at least one of said users that subscribes to said virtual object in response to said non-subscriber user taking said first action on said virtual object.

* * * * *

UNITED STATES PATENT AND TRADEMARK OFFICE
CERTIFICATE OF CORRECTION

PATENT NO. : 10,769,002 B2
APPLICATION NO. : 16/110414
DATED : September 8, 2020
INVENTOR(S) : Pin-Lung Chen et al.

Page 1 of 1

It is certified that error appears in the above-identified patent and that said Letters Patent is hereby corrected as shown below:

On the Title Page

Item (75), change inventors' names from "Pamela Chen; Rebecca L J Chen, Jacqueline Yen, Cecelia Y C Yu" to "Pin-Lung Chen, Li-Ju Chen, Li-Ling Yen, Ying-Chen Yu".

Signed and Sealed this
Fifteenth Day of December, 2020

Andrei Iancu
*Director of the United States Patent and Trademark Office*